(12) United States Patent
Merzeci et al.

(10) Patent No.: US 10,373,346 B2
(45) Date of Patent: Aug. 6, 2019

(54) METHODS AND SYSTEMS OF CUSTOMIZED DIGITAL-IMAGE PROJECTION

(71) Applicants: Baris Merzeci, Istanbul (TR); Asli Merzeci Casalino, Glendale, CA (US); Michael Joseph Casalino, Jr., Glendale, CA (US)

(72) Inventors: Baris Merzeci, Istanbul (TR); Asli Merzeci Casalino, Glendale, CA (US); Michael Joseph Casalino, Jr., Glendale, CA (US)

( * ) Notice: Subject to any disclaimer, the term of this patent is extended or adjusted under 35 U.S.C. 154(b) by 0 days.

(21) Appl. No.: 15/583,095

(22) Filed: May 1, 2017

(65) Prior Publication Data
US 2018/0315217 A1    Nov. 1, 2018

(51) Int. Cl.
*G06T 11/00* (2006.01)
*G06T 11/60* (2006.01)
(Continued)

(52) U.S. Cl.
CPC ............ *G06T 11/001* (2013.01); *G06T 11/60* (2013.01); *G03B 21/2033* (2013.01); *G06F 3/04847* (2013.01)

(58) Field of Classification Search
CPC ......... G06T 11/00; G06T 11/60; G06T 13/40; G06T 7/74; G03B 21/2033;
(Continued)

(56) References Cited

U.S. PATENT DOCUMENTS

| 2005/0007468 A1* | 1/2005 | Stavely | H04N 5/23222 348/239 |
| 2009/0290129 A1* | 11/2009 | Yoshida | H04M 1/0214 353/31 |

(Continued)

*Primary Examiner* — Xilin Guo

(57) ABSTRACT

In one aspect, a computerized method useful for managing the projection of a customizable digital image on a projection surface including the step of obtaining a customizable digital image. The method includes the step of obtaining an image of a projection surface. The method includes the step of determining a set of attributes of the projection surface. The method includes the step of modifying one or more attributes of the customizable digital image based on at least one user input. The method includes the step of modifying one or more attributes of the customizable digital image based on the set of attributes of the projection surface. The method includes the step of setting a location of the projection surface to project the customizable digital image. The method includes the step of selecting a template image element. The method includes the step of integrating the template image element into the customizable digital image. The method includes the step of selecting a set of display instructions for the customizable digital image. The method includes the step of communicating the customizable digital image, the template image element and the set of display instructions to at least one image projecting device. The method includes the step of displaying the customizable digital image and the template image element on the projection surface with the at least one image projecting device.

11 Claims, 12 Drawing Sheets

(51) Int. Cl.
*G03B 21/20* (2006.01)
*G06F 3/0484* (2013.01)

(58) Field of Classification Search
CPC .............. G06F 3/04847; G06F 3/0482; G06F 17/30244; G06F 17/3053; G06F 17/30554; G06F 3/04817; G06F 3/14; G06F 17/30056; G06Q 10/02; G06N 3/006; H04L 65/4084
See application file for complete search history.

(56) References Cited

U.S. PATENT DOCUMENTS

2013/0100495 A1* 4/2013 Akiba .................. H04N 9/3185
358/1.15
2013/0339260 A1* 12/2013 Johnson ............. G06Q 30/0185
705/318
2017/0262245 A1* 9/2017 Yoganandan ......... G06F 3/0482

\* cited by examiner

METHODS AND SYSTEMS OF CUSTOMIZED DIGITAL-IMAGE PROJECTION

BACKGROUND OF THE INVENTION

1. Field

This application relates to a system, article of manufacture, and method for customized digital-image projection.

2. Related Art

Current systems for decorating homes for a holiday or other occasion include physical decorations. Physical decorations can require installation and maintenance which can be time consuming and costly. Additionally, static images can be projected on the walls of home. Static images may be pre-generated templates that are not adaptable to a user's particular preferences. Accordingly, improvements to home decoration that include customized digital-image projection are desired.

BRIEF SUMMARY OF THE INVENTION

In one aspect, a computerized method useful for managing the projection of a customizable digital image on a projection surface including the step of obtaining a customizable digital image. The method includes the step of obtaining an image of a projection surface. The method includes the step of determining a set of attributes of the projection surface. The method includes the step of modifying one or more attributes of the customizable digital image based on at least one user input. The method includes the step of modifying one or more attributes of the customizable digital image based on the set of attributes of the projection surface. The method includes the step of setting a location of the projection surface to project the customizable digital image. The method includes the step of selecting a template image element. The method includes the step of integrating the template image element into the customizable digital image. The method includes the step of selecting a set of display instructions for the customizable digital image. The method includes the step of communicating the customizable digital image, the template image element and the set of display instructions to at least one image projecting device. The method includes the step of displaying the customizable digital image and the template image element on the projection surface with the at least one image projecting device.

Figure 1:
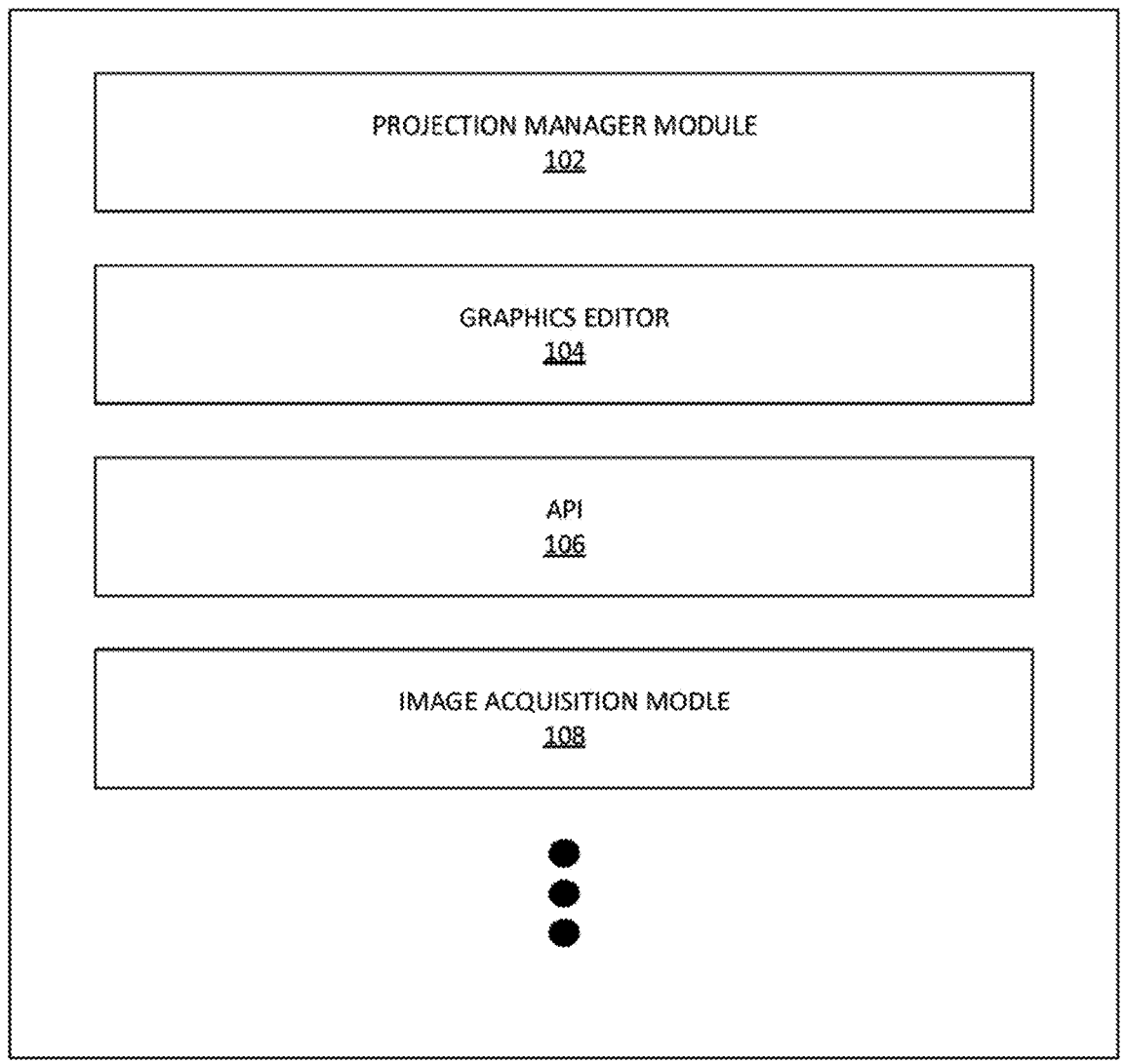
FIG. 1 illustrates an example system for projection of an image onto a large surface, according to some embodiments.

The Figures described above are a representative set, and are not an exhaustive with respect to embodying the invention,

DESCRIPTION

Disclosed are a system, method, and article of manufacture for methods and systems of customized digital-image projection. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature structure, or characteristic described in connection with the embodiment is included in at least one embodiment of the present invention. Thus, appearances of the phrases 'in one embodiment,' 'in embodiment,' similar language throughout this specification may, but do not necessarily, all refer to the same embodiment.

Furthermore, the described features, structures, or characteristics of the invention may be combined in any suitable manner in one or more embodiments, in the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can specify how software components of various systems interact with each other.

Cloud computing can involve deploying groups of remote servers and/or software networks that allow centralized data storage and online access to computer services or resources. These groups of remote serves and/or software networks can be a collection of remote computing services.

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector, machines, clustering, Bayesian networks, reinforcement learning, representation learning, similarity and metric learning, and/or sparse dictionary learning.

Mobile device can include a handheld computing device that includes an operating system (OS), and can run various types of application software known as apps. Example handheld devices can also be equipped with various context sensors (e.g. biosensors, physical environmental sensors, etc.), digital cameras, Wi-Fi, Bluetooth, and/or GPS capabilities. Mobile devices can allow connections to the Internet and/or other Bluetooth-capable devices, such as an automobile, a wearable computing system and/or a microphone headset. Exemplary mobile devices can include smart phones, tablet computers, optical head-mounted display (OHMD) (e.g. Google Glass®), virtual reality head-mounted display, smart watches, other wearable computing systems, etc.

Object recognition (also called object classification) one or several pre-specified or learned objects or object classes can be recognized, usually together with their 2D positions in a digital image or 3D poses in a scene.

Projector can be an optical device that projects an image (or moving images) onto a surface, commonly a projection screen. In one example, a projector can create an image by shining a light through a transparent lens. In another example, a projector can project the image directly (e.g. with the use of lasers, etc.).

Example Computer Architecture and Systems

FIG. 1 illustrates an example system 100 for projection of an image onto a large surface, according to some embodiments. Generally, system 100 can be utilized to customize digital images for projection onto a specified surface. System 100 can obtain holiday-related templates as well for projection onto the specified surface. System 100 can enable a user to a set up a display on a virtual version of the specified surface by selecting customizable digital images and/or templates. These customizable digital images and/or templates can be overlaid on the virtual version of the specified surface. The attributes of the customizable digital images and/or templates can be selected and/or specified by the user. This information can be communicated to one or more image projection devices (e.g. a laser projector, etc.). A set of display instructions (e.g. time of day, duration of display, etc.) can also be communicated to the one or more image projection devices. The one or more image projection devices can then implement the instructions and display the user-specified customizable digital images and/or templates.

System 100 can also include an image-projection module that can display stored graphical images. Image-projection module 102 can often handle various graphics file formats. Image-projection module can render the image according to properties of the display, such as, inter alia: color depth, display resolution, and color profile. Image-projection module 102 can decode a next image in advance and keep previous decoded image in memory for fast image changes. Image-projection module 102 can display (and edit) meta-data (e.g. XMP, IPTC Information Interchange Model and Exif, etc.). Image-projection module 102 can implement batch conversion (e.g. image format, image dimensions, etc.) and renaming operations. Image-projection module 102 can generate/render images to be projected on a mobile-device display for a user to curate and/or edit prior to uploading to an image projection device. For example, image-projection module 102 can create HTML thumbnail pages for a user to manually review and interact with. Image-projection module 102 can provide various transition effects for slideshows.

System 100 can include a graphics editor 104. Graphics editor 104 can be utilized to customize digital images (e.g. customized-projection image, etc.). Graphics editor 104 can include a computer program that allows users to create and edit images interactively on a computer screen (e.g. a mobile device's display, etc.) and save them in one of many "bitmap" or "raster" formats such as JPEG, PNG, GIF and TIFF. Graphics editor 104 can implement object recognition on images to be projected. This functionality can be used to automatically pull digital images with specified content for projection. This functionality can also be utilized to filter specified digital images and/or image content (e.g. offensive content, etc.). Graphics editor 104 can utilize API 106 to access an online social network in order to pull various digital images from one or more social network profiles. Graphics editor 104 can utilize API 106 to access an online digital image repository and/or utilize an online digital-image search engine. Graphics editor 104 can modify/update obtained images for projection via an image projecting device.

API 06 can be used by other programs/systems to interact with system 100 and/or its modules. API 106 can also access other programs/systems on behalf of system 100 and/or its modules.

Image-acquisition module 108 can obtain digital images from various sources. Image-acquisition module 108 can obtain digital images from online sources. Image-acquisition module 108 can obtain digital images from a mobile-devices digital camera system. Image-acquisition module 10S can obtain digital images from a set of pre-provided templates from a mobile-device application store. Pre-provided templates can include various holiday-themed images (e.g. Christmas decorations, Halloween decorations, birthday decorations, etc.) that can be projected onto the exterior surface of a residential home or other building. It is noted that a hybrid of pre-provided templates and user created images can be generated and projected as well. For example, one or more birthday templates can be integrated into a digital image of an individual having the birthday celebration.

System 100 can include other functionalities for the optimization of the projection of an image onto a large surface. For example, system 100 can utilize machine learning techniques (e.g. artificial neural networks, etc.) to implement module image recognition and/or computer-vision/OCR module operations. Machine learning can also be utilized to optimize image size and other attribute for projection onto the projection surface. For example, an image of the projection surface can be obtained and analyzed. For example, the image projection surface can be the front of a residential home. The user can take digital pictures of the front of the home and feed these into an image-projection mobile application that includes system 100. System 100 can then fit the digital pictures to a size that is appropriate for projection onto the available exterior surfaces of the home. System 100 can also automatically modify various attributes of the digital pictures (e.g. color, brightness, contrast, etc.) to optimize the presentation of the digital picture content in a projected format.

It is noted that system 100 can update image projection attributes as ambient and/or other environmental factors change in real time. For example, system 100 can automatically update the color, brightness, contrast, etc. attributes as the ambient light changes throughout the day/night. System 100 can include a library of pre-set user preferences to use in said image optimization operations. In the event that a user has not yet provided his/her image preferences, a default set of preferences can be available. Additionally, event-specific image optimization preferences can also be provided. For example, Christmas-related images can be optimized for the known traditional colors and themes of Christmas (e.g. green and red, etc.). In another example, Halloween-related images can be optimized for the known traditional colors and themes of Halloween (e.g. orange and black, etc.).

System 100 can manage the kinetic motion of a projected image on a surface. System 100 can analyze a surface to determine an optimal path of a moving projected image. The optimal path can be automatically modified in the event an object is placed in the way of the projection system. System 100 can provide for audio tracks to accompany image projection. In the event of a kinetic motion, system 100 can automatically synchronize image motion with the audio track's rhythm values. System 100 can also include various ranking algorithms and/or other AI systems that assist in the implement ion of automating and/or optimizing image projection.

System 100 can be implemented in various computing devices and/or platforms. Portions of system 100 can be implemented in a mobile device. Portions of system 100 can be implemented in an image projecting device. Portions of system 100 can be implemented exemplary computing system 200 and/or sample computing environment 300. The analytics and/or machine learning aspects of system 100 can be implemented in a cloud-computing platform.

Figure 2:
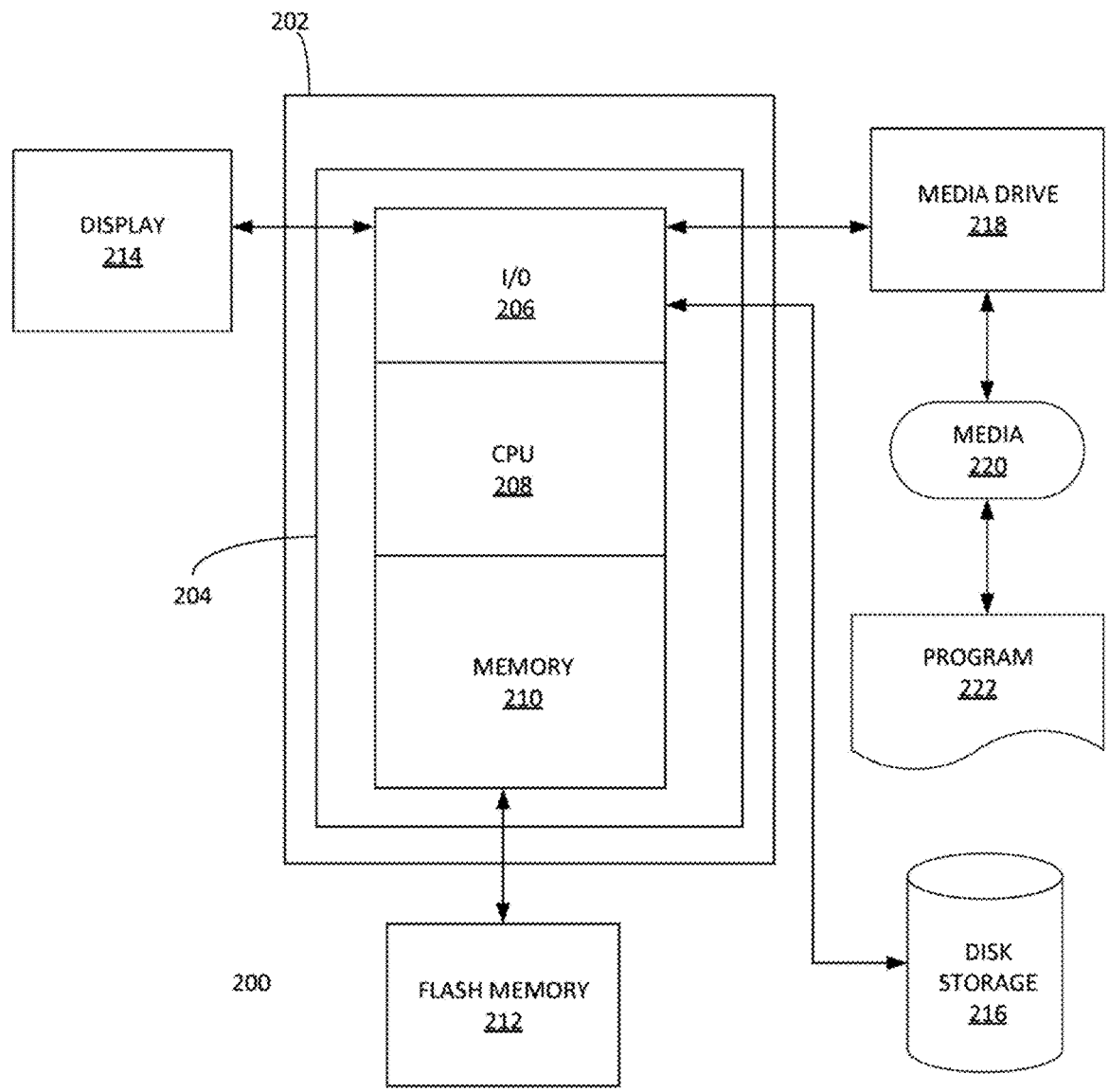
FIG. 2 depicts an exemplary computing system that can be configured to perform any one of the processes provided herein.

FIG. 2 depicts an exemplary computing system 200 that can be configured to perform any one of the processes provided herein. In this context, computing system 200 may include, for example, a processor, memory, storage, and I/O devices (e.g., monitor, keyboard, disk drive, Internet connection, etc.). However, computing system 200 may include circuitry or other specialized hardware for carrying out some or all aspects of the processes. In some operational settings, computing system 200 may be configured as a system that includes one or more units, each of which is configured to carry out some aspects of the processes either in software, hardware, or some combination thereof.

FIG. 2 depicts computing system 200 with a number of components that may be used to perform any of the processes described herein. The main system 202 includes a motherboard 204 having an I/O section 206, one or more central processing units (CPU) 208, and a memory section 210, which may have a flash memory card 212 related to it. The I/O section 206 can be connected to a display 214, a keyboard and/or other user input (not shown), a disk storage unit 216, and a media drive unit 218. The media drive unit 218 can read/write a computer-readable medium 220, which can contain programs 222 and/or data. Computing system 200 can include a web browser. Moreover, it is noted that computing system 200 can be configured to include additional systems in order to fulfill various functionalities. Computing system 200 can communicate with other computing devices based on various computer communication protocols such as Wi-Fi, Bluetooth® (and/or other standards for exchanging data over short distances includes those using short-wavelength radio transmissions), USB, Ethernet, cellular, an ultrasonic local area communication protocol, etc.

Figure 3:
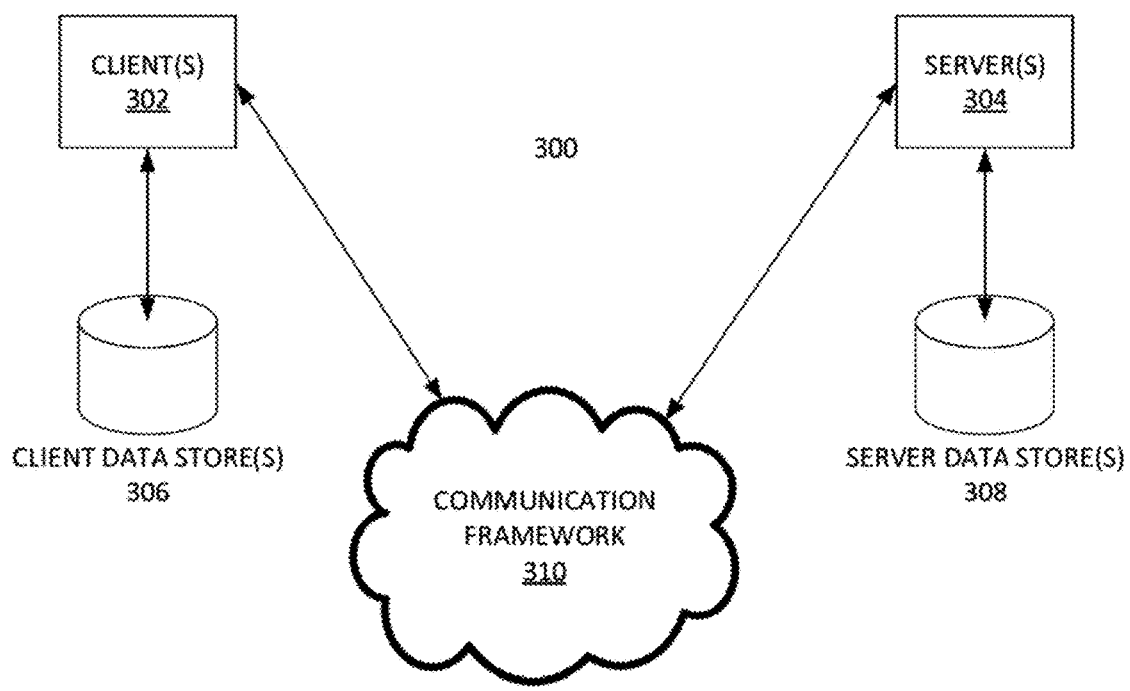
FIG. 3 is a block diagram of a sample computing environment that can be utilized to implement various embodiments.

FIG. 3 is a block diagram of a sample computing environment 300 that can be utilized to implement various embodiments. The system 300 further illustrates a system that includes one or more client(s) 302. The client(s) 302 can be hardware and/or software (e.g., threads, processes, computing devices). The system 300 also includes one or more server(s) 304. The server(s) 304 can also be hardware and/or software (e.g., threads, processes, computing devices). One possible communication between a client 302 and a server 304 may be in the form of a data packet adapted to be transmitted between two or more computer processes. The system 300 includes a communication framework 310 that can be employed to facilitate communications between the client(s) 302 and the server(s) 304. The client(s) 302 are connected to one or more client data store(s) 306 that can be employed to store information local to the client(s) 302. Similarly, the server(s) 304 are connected to one or more server data store(s) 308 that can be employed to store information local to the server(s) 304. In some embodiments, system 300 can instead be a collection of remote computing services constituting a cloud-computing platform.

Exemplary Methods

Figure 4:
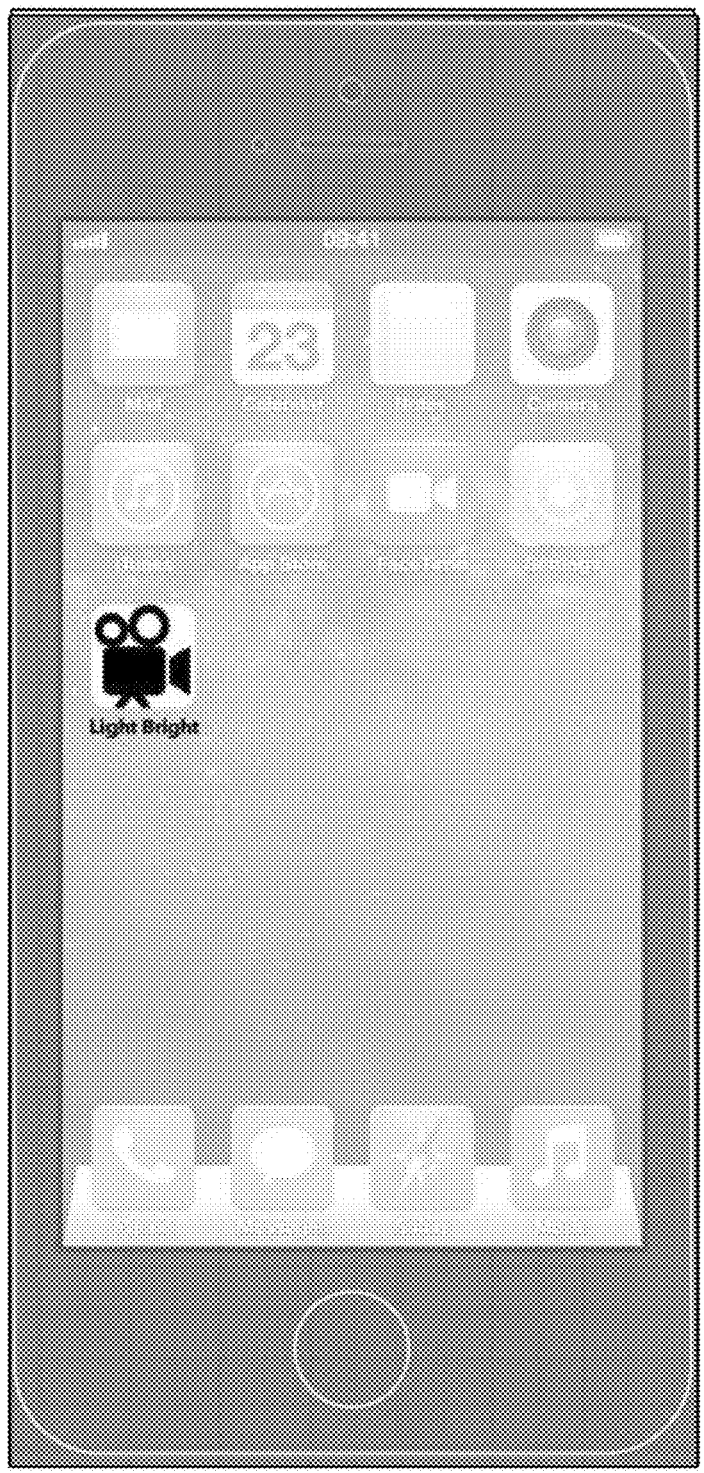
FIG. 4 illustrates an example screen shot of mobile-device application used to manage an image-projection device, according to some embodiments.

FIGS. 4-12 illustrate an example set of screen shots illustrating an example use case of customized digital-image projection. More particularly, FIG. 4 illustrates an example screen shot of mobile-device application 400 used to manage an image-projection device, according to some embodiments. An image-projection device can be managed using a mobile-device application 400. The image-projection device can project customized images onto outdoor surfaces. For example, slide images can be customized and/or selected from a library of slide images. Slide images can be converted from other digital images. Slide images can be processed for projection onto an outdoor projection surface. Example projection surfaces can include, inter alia: building walls, automobiles, bill boards, walls, roads, lawns, etc. The projected slide image dimensions can be manually and/or automatically adjusted to match the projection surface dimensions. It is noted that, in other examples, image-projection device can project customized images onto indoor projections surfaces such as a projection screen or room's wall.

As noted supra, mobile-device application 400 can include digital-image editing functionalities and/or tools to modify digital images into customized images. Digital images can be modified for by a user. Digital images can also be automatically modified by mobile-device application 400 (e.g. to fit onto a selected projection surface, to optimize slide image based on ambient lighting, to optimize slide image based on contours of projection surface, to optimize slide image based on color of projection surface, etc.). In some examples, mobile-device application 400 can include system 100 discussed supra.

Figure 5:
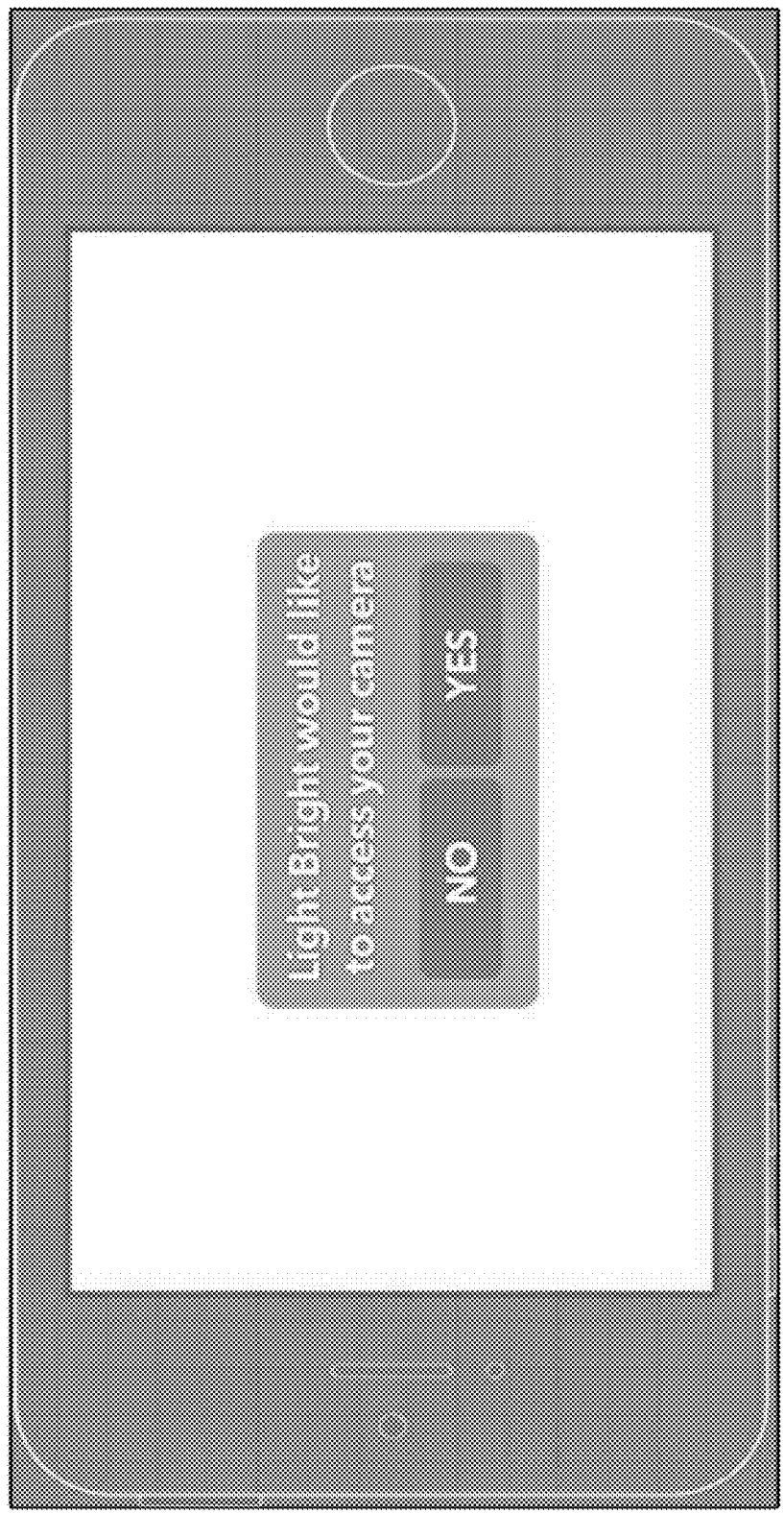
FIG. 5 illustrates another screen shot of a mobile-device application that manages projection of digital images, according to some embodiments.

FIG. 5 illustrates another screen shot 500 of a mobile-device application that manages projection of digital images, according to some embodiments. More particularly, screen shot 500 illustrates a request to access a set of digital images stored in the mobile, device.

Figure 6:
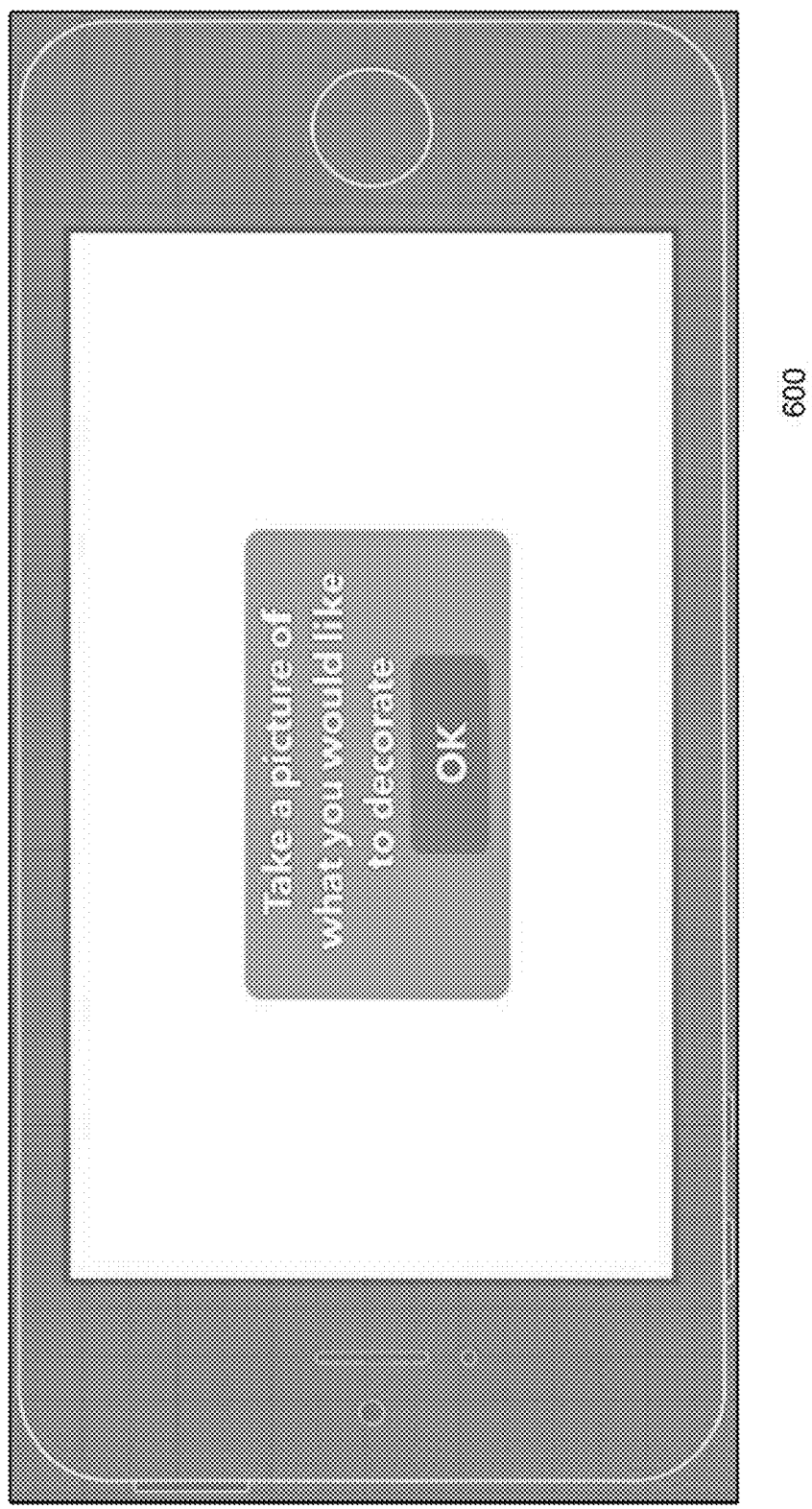
FIG. 6 illustrates another screen shot of a mobile-device application that manages projection of digital images, according to some embodiments.
Figure 7:
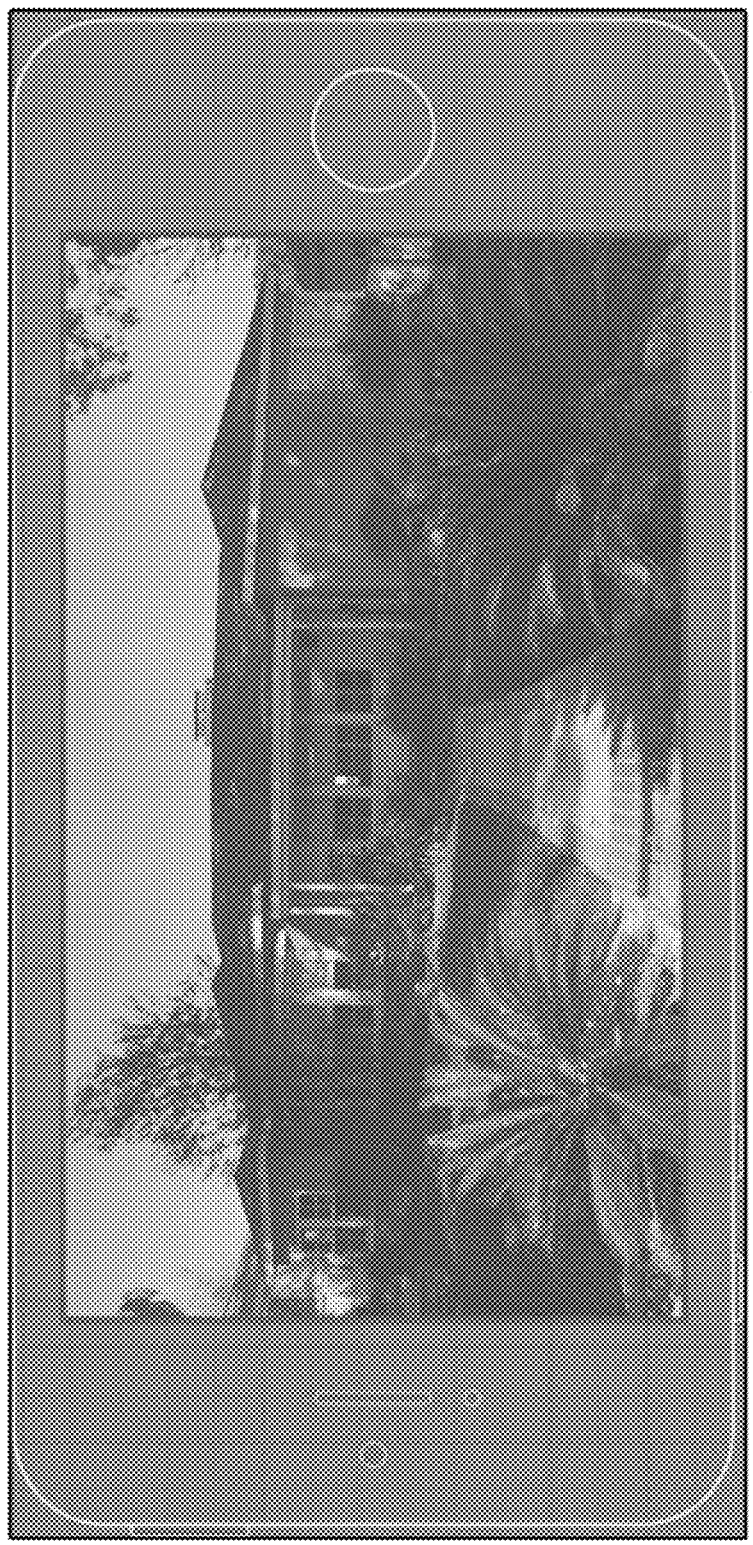
FIG. 7 illustrates an example digital image of an exterior of a residential home, according to some embodiments.

FIG. 6 illustrates another screen shot 600 of a mobile-device application that manages projection of digital images, according to some embodiments. More particularly, screen shot 600 illustrates a prompt to a user to obtain a digital image. The digital image can then be converted into a customized-projection image. In one example, image-acquisition module 108 of system 100 can obtain the digital image and provide it to graphics editor module 104 for customization. Graphics editor module 104 can modify and/or enhance the digital image based on user input and/or other preferences. Graphics editor module 104 can provide the digital image to projection manager module 102. Projection manager module 102 can manage the projection of the image onto a user-specified exterior home surface. The customized-projection image can be further optimized based on the dimension and/or other features of the user-specified exterior home surface FIG. 7 illustrates an example digital image 700 of an exterior of a residential home, according to some embodiments. Digital image 700 can be displayed on a mobile-device application. System 100 can manage the projection of the a customized-projection image onto the exterior of a residential home. As noted supra, system 100 can analyze the'various attributes of digital image 700 to optimize the attributes of the customized-projection image. For example, the various dimensions and/or elements of the exterior of the residential home and be analyzed to determine the projected dimensions and locations of the customized-projection image. For example, a door element in digital image 700 can be used to as a standardizing element to determine various dimensions of other image elements. Based on this assessment, the customized-projection image can then be set. In this way, the customized-projection image can have the same appearance and/or effect as its real-world counterpart. For example, a customized-projection image of Christmas lights can have the same sizes as standard physical Christmas lights. The location and/or other attributes of the image projection device can also be included in the calculations for se g the customized-projection image.

Figure 8:
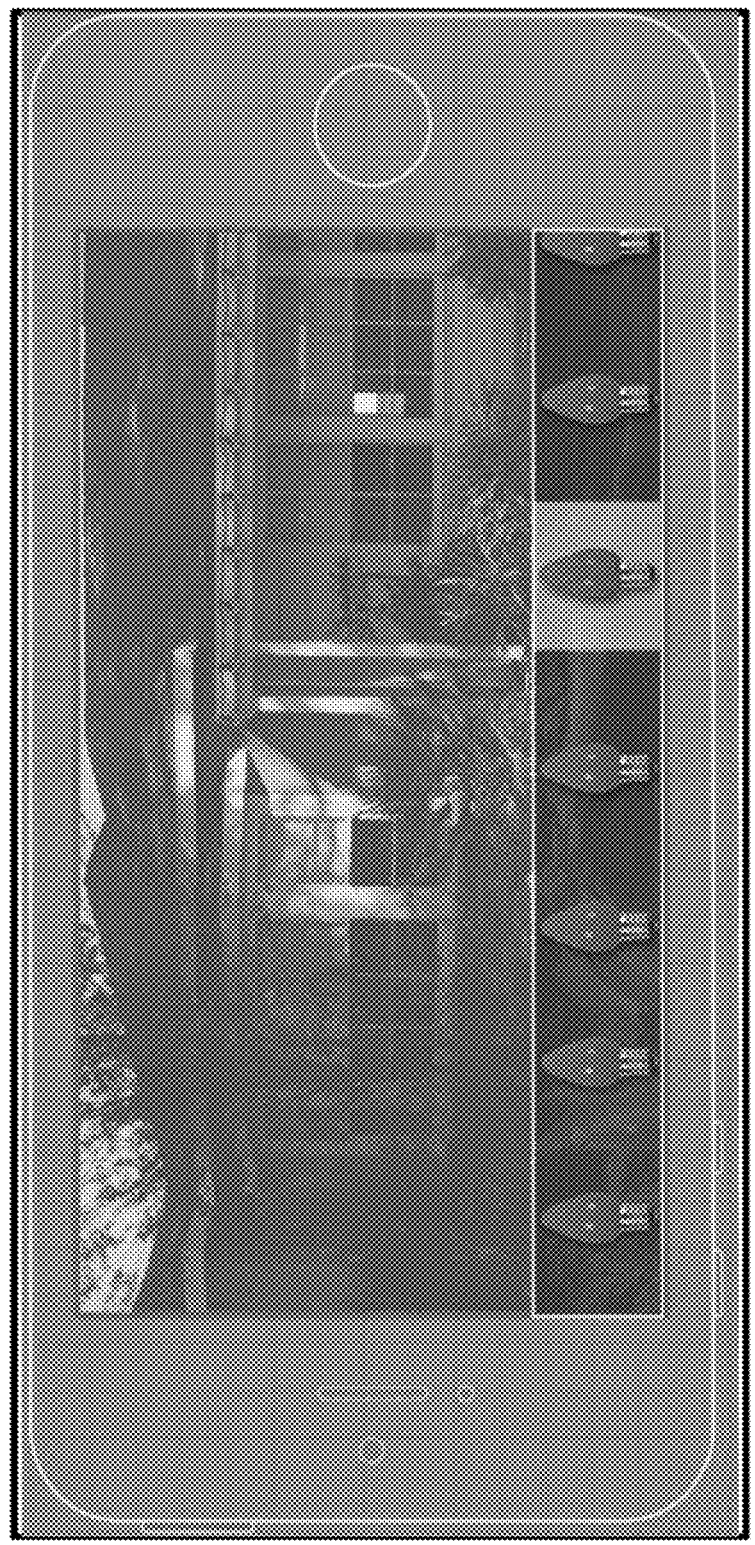
FIG. 8 illustrates another example digital image of an exterior of a residential home, according to some embodiments.

FIG. 8 illustrates another example digital image 800 of an exterior of a residential home, according to some embodiments. Digital image 800 can be displayed on a mobile-device application. In this view, a user can indicate template image elements to be projected onto the exterior of the residential home. For example, the template image elements can be Christmas lights. The user can select the various attributes of the Christmas lights to be projected (e.g. color, size, location, blink rate, etc.). The user can set the times and period for projection of the Christmas lights. The user can set the various attributes of the Christmas lights to modify as a function of time. For example, one night the Christmas lights can be red. The next night the Christmas lights can be green. For the first hour, the Christmas lights can blink. The next hour the Christmas light can alternate between colors at a specified rate. The user can also set the location of the Christmas lights to change at different times. The mobile device can provide various Christmas light display options for the user to select by tapping the appropriate icon on the mobile device touchscreen. In one example, the brightness of the Christmas light display can be set to decrease to a lower setting after a specified time of night. These embodiments are provided by way of example and not of limitation.

Figure 9:
FIG. 9 illustrates another example digital image of an exterior of a residential home, according to some embodiments.

FIG. 9 illustrates another example digital image 900 of an exterior of residential home, according to some embodiments. Digital image 900 includes various tools for enabling a user to select a Christmas wreath digital image for projection onto the front door. The mobile device can provide various Christmas wreath display options for the user to select by tapping the appropriate icon on the mobile device touchscreen. The dimensions of the projected version of the Christmas wreath can be calculated based on the front door dimensions. The dimensions of the front door can be assumed from standard door sizes. Additionally, a user can manually indicate a size/dimension modifications (e.g. by various touchscreen inputs, etc.). In one example, system 100 can automatically perform an image recognition operation and identify the front door. The Christmas wreath can then be first set to be projected onto the front door unless manually changed by the user. For example, digital image 900 illustrates that Christmas wreath on a portion of the front wall, of the residential home.

Figure 10:
FIG. 10 illustrates another screen shot of a mobile-device application that manages projection of digital images, according to some embodiments.

FIG. 10 illustrates another screen shot 1000 of a mobile-device application that manages the projection of digital images, according to some embodiments. More particularly, screen shot 1000 illustrates a prompt to, a user to finalize setting up a display of Christmas related customized-projection images.

Figure 11:
FIG. 11 illustrates an example digital image of an, exterior of a residential home with a plurality of Christmas-related customized-projection images, according to some embodiments.

FIG. 11 illustrates an example digital image 1100 of an exterior of a residential home with a plurality of Christmas-related customized-projection images, according to some embodiments. One or more image projecting devices can be utilized to project the customized-projection images onto the front exterior of the residential home. The user can also view the current state of the customized-projection images via the mobile-device application. For example, if an image projecting device ceases to operate properly, system 100 can modify the view of digital image 1100 to indicate the portions of the Christmas display that are no longer being projected. The user can then modify the Christmas display in real time based on the remaining image projecting devices.

It is noted that image projecting devices can include security systems that alert the user via a push notification in the even that they are tampered with in some manner. For example, if an image projecting device is moved beyond a specified radius of its set location, it can send out an alter to the user. The image projecting device can also include various location tracking systems (e.g. GPS, etc.) such that the user can track its location in real time. As used herein, 'real time' can assume processing and networking latencies.

Figure 12:
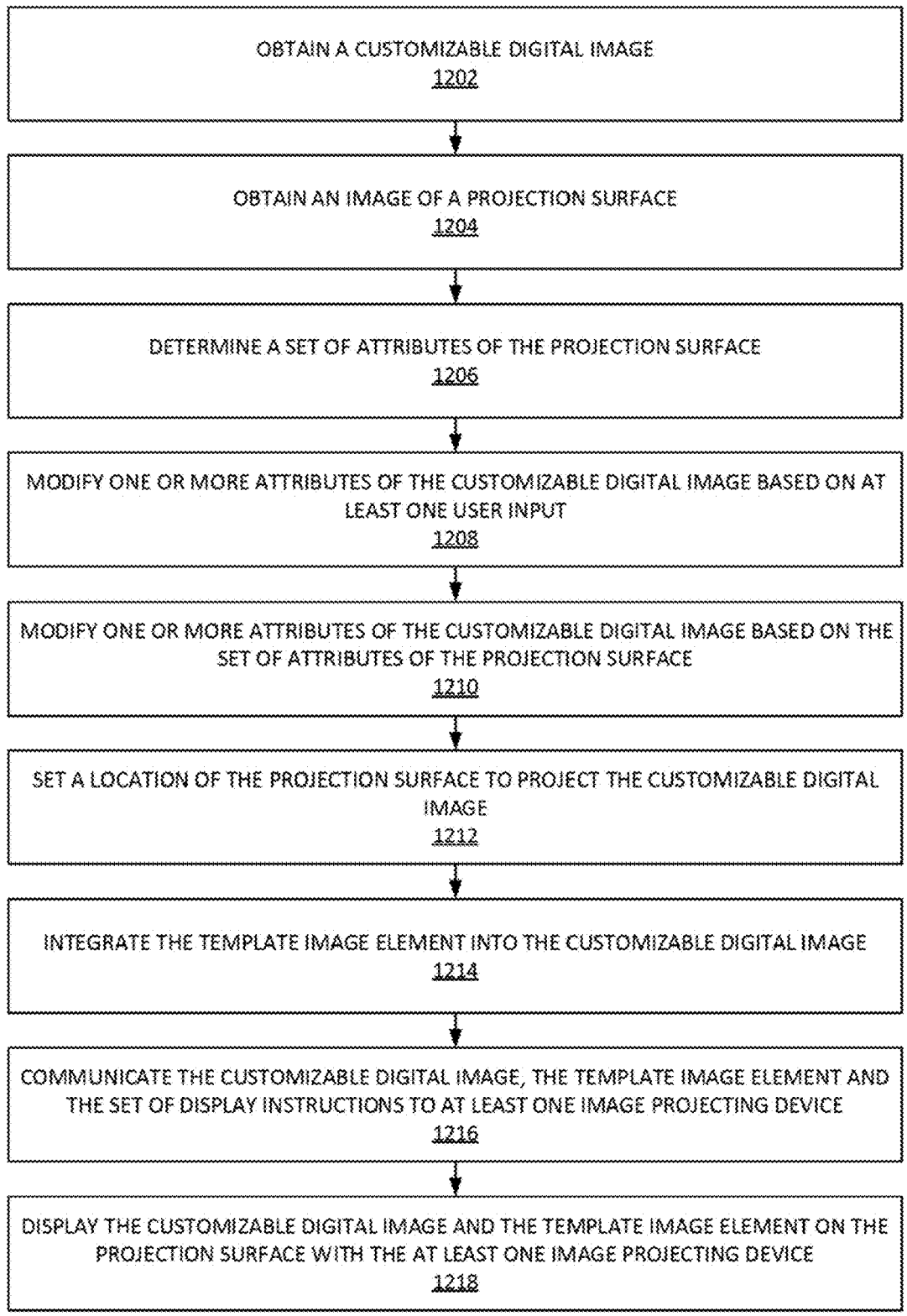
FIG. 12 illustrates a computerized method useful for managing the projection of a customizable digital image on a projection surface, according to some embodiments.

FIG. 12 illustrates a computerized method useful for managing the projection of a customizable digital image on a projection surface, according to some embodiments. In step 1202, process 1200 can obtain a customizable digital image. In step 1204, process 1200 can obtain an image of a projection surface. In step 1206, process 1200 can determine a set of attributes of the projection surface. In step 1208, process 1200 can, with a computer application, modify one or more attributes of the customizable digital image based on at least one user input. In step 1210, process 1200 can modify one or more attributes of the customizable digital image based on the set of attributes of the projection surface. In step 1212, process 1200 can set a location of the projection surface to project the customizable digital image. In step 1214, process 1200 can select a template image element. In step 1216, process 1200 can integrate the template image element into the customizable digital image. In step 1218, process 1200 can select a set of display instructions for the customizable digital image. In step 1220, process 1200 can communicate the customizable digital image, the template image element and the set of display instructions to at least one image projecting device. In step 1222, process 1200 can display the customizable digital image and the template image element on the projection surface with the at least one image projecting device.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as a new and desired to be protected by Letters Patent of the United States is:

1. A computerized method useful for managing the projection of a customizable digital image on a projection surface comprising:
   obtaining a customizable digital image;
   obtaining an image of a projection surface;
   determining a set of attributes of the projection surface;
   with a computer application:
      modifying one or more attributes of the customizable digital image based on at least one user input;
      modifying one or more attributes of the customizable digital image based on the set of attributes of the projection surface;
   setting a location of the projection surface to project the customizable digital image;
   selecting a template image element, wherein the template image element comprises a holiday-themed template image element, and wherein the holiday template image element comprises a Christmas-light image, and wherein the computer application comprises a mobile-device application;
   integrating the template image element into the customizable digital image;
   selecting a set of display instructions for the customizable digital image;
   communicating the customizable digital image, the template image element and the set of display instructions to at least one image projecting device; and
   displaying the customizable digital image and the template image element on the projection surface with the at least one image projecting device.

2. The computerized method of claim 1, wherein the customizable digital image is obtained from a digital camera of a mobile device.

3. The computerized method of claim 1, wherein the customizable digital image is obtained from an online social network.

4. The computerized method of claim 1 further comprising:
   with the mobile-device application:
   presenting the user with a set of Christmas lights to select; and
   receiving at least one Christmas light selection from the user, wherein the user determines a Christmas light color, a Christmas light size and a Christmas light blink-rate.

5. The computerized method of claim 1, wherein the step of modifying one or more attributes of the customizable digital image further comprises:
   selecting a color attribute of the customizable digital image; and
   selecting a time period of display of the customizable digital image.

6. The computerized method of claim 5, wherein the image projection device comprises a laser projector.

7. A computerized system useful for managing the projection of a customizable digital image on a projection surface comprising:
   a computer store containing data, wherein the data comprises:
      a customizable digital image, a template image element, and a set of display instructions for the customizable digital image with one or more image projection devices;
   a computer processor in the computerized system, which computer processor:
      obtain a customizable digital image;
      obtain an image of a projection surface;
      determine a set of attributes of the projection surface;
      with a computer application:
         modify one or more attributes of the customizable digital image based on at least one user input;
         modify one or more attributes of the customizable digital image based on the set of attributes of the projection surface;
      set a location of the projection surface to project the customizable digital image;
      select a template image element, wherein the template image element comprises a holiday-themed template image element, and wherein the holiday template image element comprises a Christmas-light image, and wherein the computer application comprises a mobile-device application;
      integrate the template image element into the customizable digital image;
      select a set of display instructions for the customizable digital image;
      communicate the customizable digital image, the template image element and the set of display instructions to at least one image projecting device; and display the customizable digital image and the template image element on the projection surface with the at least one image projecting device.

8. The computerized system of claim 7, wherein the customizable digital image is obtained from a digital camera of a mobile device.

9. The computerized system of claim 7, wherein the customizable digital image is obtained from an online social network.

10. The computerized system of claim 9, wherein the image projection device comprises a laser projector.

11. A computerized system useful for managing the projection of a customizable digital image on a projection surface comprising:
- a computer store containing data, wherein the data comprises:
  - a customizable digital image, a template image element, and a set of display instructions for the customizable digital image with one or more image projection devices;
- a computer processor in the computerized system, which computer processor:
  - obtain a customizable digital image;
  - obtain an image of a projection surface;
  - determine a set of attributes of the projection surface, wherein the projection surface comprises an outdoor projection surface;
  - with a computer application:
    - modify one or more attributes of the customizable digital image based on at least one user input, and wherein the step of modifying one or more attributes of the customizable digital image further comprises:
      - select a color attribute of the customizable digital image; and
      - select a time period of display of the customizable digital image;
    - modify one or more attributes of the customizable digital image based on the set of attributes of the projection surface;
  - set a location of the projection surface to project the customizable digital image;
  - select a template image element, wherein the template image element comprises a holiday-themed template image element, and wherein the computer application comprises a mobile-device application;
  - integrate the template image element into the customizable digital image;
  - select a set of display instructions for the customizable digital image;
  - communicate the customizable digital image, the template image element and the set of display instructions to at least one image projecting device; and
  - display the customizable digital image and the template image element on the projection surface with the at least one image projecting device,
  - and wherein the image projection device comprises a laser projector.

* * * * *